United States Patent
Liu et al.

(10) Patent No.: US 10,776,716 B2
(45) Date of Patent: Sep. 15, 2020

(54) UNSUPERVISED LEARNING UTILIZING SEQUENTIAL OUTPUT STATISTICS

(71) Applicant: Microsoft Technology Licensing, LLC, Redmond, WA (US)

(72) Inventors: Yu Liu, Bellevue, WA (US); Jianshu Chen, Woodinville, WA (US); Li Deng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 711 days.

(21) Appl. No.: 15/621,753

(22) Filed: Jun. 13, 2017

(65) Prior Publication Data
US 2018/0357566 A1 Dec. 13, 2018

(51) Int. Cl.
*G06N 20/00* (2019.01)
*G10L 15/06* (2013.01)
*G10L 15/197* (2013.01)
*G06N 7/00* (2006.01)

(52) U.S. Cl.
CPC ............. *G06N 20/00* (2019.01); *G06N 7/005* (2013.01); *G10L 15/063* (2013.01); *G10L 15/197* (2013.01)

(58) Field of Classification Search
None
See application file for complete search history.

(56) References Cited

U.S. PATENT DOCUMENTS

| 8,832,000 B2 | 9/2014 | Jebara |
| 9,269,043 B2 | 2/2016 | Nugent |
| 9,460,557 B1 | 10/2016 | Tran et al. |
| 2014/0257805 A1 | 9/2014 | Huang et al. |
| 2017/0032035 A1 | 2/2017 | Gao et al. |

FOREIGN PATENT DOCUMENTS

WO 2016156864 A1 10/2016

OTHER PUBLICATIONS

Alshawi, Hiyan, "Effective Utterance Classification with Unsupervised Phonotactic Models", Jun. 2003, Proceedings of HLT-NAACL 2003, pp. 1-7 (Year: 2003).*
Maas et al, "Lexicon-Free Conversational Speech Recognition with Neural Networks", Jun. 2015, 2015 Annual Conference of the North American Chapter of the ACL, pp. 345-354 (Year: 2015).*
Xu et al., "Fundamental Knowledge of Machine Learning", In Publication of Springer, 2015, pp. 23-35.
(Continued)

*Primary Examiner* — Daniel C Puentes
(74) *Attorney, Agent, or Firm* — Schwegman Lundberg & Woessner, P.A.

(57) ABSTRACT

In classification tasks applicable to data that exhibit sequential output statistics, a classifier may be trained in an unsupervised manner based on a sequence of input samples and an unaligned sequence of output labels, using a cost function that measures the negative cross-entropy of an N-gram joint probability distribution derived from the sequence of output labels with respect to an expected N-gram frequency in a second sequence of output labels predicted by the classifier. In some embodiments, a primal-dual reformulation of the cost function is employed to facilitate optimization.

20 Claims, 7 Drawing Sheets

(56) References Cited

OTHER PUBLICATIONS

Mehrkanoon, et al., "Multiclass Semisupervised Learning Based Upon Kernel Spectral Clustering", In Proceedings of IEEE Transactions on Neural Networks and Learning Systems, Apr. 2015, pp. 1-13.

Julius, et al., "On the Modeling of Error Functions as High Dimensional Landscapes for Weight Initialization in Learning Networks", In Proceedings of International Conference on Embedded Computer Systems: Architectures, Jul. 17, 2016, pp. 1-9.

Chen, et al., "A Primal-Dual Method for Training Recurrent Neural Networks Constrained by the Echo-State Property", In Proceedings of International Conference on Learning Representations, Nov. 24, 2013, pp. 1-19.

Bengio, Yoshua, "Learning Deep Architectures for AI", In Journal of Foundations and Trends in Machine Learning, vol. 2, Issue 1, Jan. 2009, 35 pages.

Bengio, et al., "Greedy layer-wise training of deep networks", In Journal of Advances in neural information processing systems, vol. 19, Dec. 2007, 8 pages.

Berg-Kirkpatrick, et al., "Unsupervised Transcription of Historical Documents", In Proceedings of the 51st Annual Meeting of the Association for Computational Linguistics, Aug. 9, 2013, pp. 207-217.

Blei, et al., "Latent Dirichlet Allocation", In Journal of Machine Learning Research, vol. 3, Mar. 2003, 30 pages.

Boyd, et al., "Convex Optimization", In Publication of Cambridge University Press, 2004, 2 pages.

Chen, et al., "End-to-end Learning of LDA by Mirror-Descent Back Propagation over a Deep Architecture", In Proceedings of Annual Conference on Neural Information Processing System, Dec. 7, 2015, pp. 1-19.

Chen, et al., "Unsupervised learning of predictors from unpaired input-output samples", In Journal of Computing Research Repository, Jun. 2016, pp. 1-9.

Chintala, et al., "A path to unsupervised learning through adversarial networks", https://code.facebook.com/posts/1587249151575490/apath-to-unsupervised-learning-through-adversarialnetworks/, Published on: Jun. 20, 2016, 9 pages.

Dahl, et al., "Context-dependent pre-trained deep neural networks for large-vocabulary speech recognition", In Journal of IEEE Transactions on Audio, Speech, and Language Processing, vol. 20, Issue 1, Jan. 2012, pp. 30-42.

Dai, et al., "Semi-supervised sequence learning", In Proceedings of the Advances in Neural Information Processing Systems, Dec. 7, 2015, pp. 1-10.

Deng, Li, "Deep learning for speech and language processing", In TechReport MSR-TR-2015-77, Sep. 2015, 200 pages.

Fang, et al. "From captions to visual concepts and back.", In Proceedings of the IEEE Conference on Computer Vision and Pattern Recognition, Jun. 2015., 10 pages.

Goodfellow, Ian, "Generative adversarial networks", In Journal of Computing Research Repository, Jan. 2017, pp. 1-57.

Goodfellow, et al., "Generative adversarial nets", In Proceedings of the Advances in Neural Information Processing Systems, Dec. 8, 2014, pp. 1-9.

Goodfellow, et al., "Deep Learning", In Publication of MIT press, Nov. 2016.

Hastings, W Keith, "Monte carlo sampling methods using markov chains and their applications", In Journal of Biometrika, vol. 57, No. 1, Apr. 1970, pp. 97-109.

Geoffrey, et al., "Deep neural networks for acoustic modeling in speech recognition: The shared views of four research groups", In IEEE Signal Processing Magazine, vol. 29, Issue 6, Nov. 2012, pp. 82-97.

Hinton, et al., "Reducing the dimensionality of data with neural networks", In Journal of Science, vol. 313, Issue 5786, Jul. 28, 2006, pp. 504-507.

Hinton, et al., "A fast learning algorithm for deep belief nets", In Journal of Neural Computation, vol. 18, Issue 7, Jul. 2006, pp. 1527-1554.

Jordan, et al., "An introduction to variational methods for graphical models", In Journal of Machine Learning, vol. 37, Issue 2, Nov. 1999, pp. 183-233.

Le, et al., "Building high-level features using large scale unsupervised learning", In Proceedings of the 29th International Conference on Machine Learning, May 26, 2013, 11 pages.

Mesnil, et al., "Using recurrent neural networks for slot filling in spoken language understanding", In Journal of IEEE/ACM Transactions on Audio, Speech, and Language Processing, vol. 23, No. 3, Mar. 2015, pp. 530-539.

Mikolov, et al., "Efficient estimation of word representations in vector space", In Journal of the Computing Research Repository, Jan. 2013, pp. 1-13.

Smolensky, Paul, "Information processing in dynamical systems: foundations of harmony theory", In Technical Report of CU-CS-321-86, 1986, pp. 194-281.

Stewart, et al., "Label-free supervision of neural networks with physics and domain knowledge", In Proceedings of be Thirty-First AAAI Conference on Artificial Intelligence, Feb. 4, 2017, 7 pages.

Sutskever, et al., "Towards principled unsupervised learning", In Journal of Computing Research Repository, Nov. 2015, pp. 1-9.

Vincent, et al., "Stacked denoising autoencoders: Learning useful representations in a deep network with a local denoising criterion", In Journal of Machine Learning Research, vol. 11, Dec. 2010, pp. 3371-3408.

Knight, et al., "Unsupervised analysis for decipherment problems", In Proceedings of the COLING/ACL on Main conference poster sessions, Jul. 17, 2006, pp. 499-506.

Krizhevsky, et al., "ImageNet classification with deep convolutional neural networks", In Proceedings of 26th Annual Conference on Neural Information Processing Systems, Dec. 3, 2012, pp. 1-9.

Kay, et al., "Tesseract: An open-source optical character recognition engine", In Linux Journal, vol. 2007, Issue 159, Jul. 2007, 11 pages.

Phillips, et al., "UW-III English_Technical Document Image Database", http://isis-data.science.uva.nl/events/dlia/datasets/uwash3.html, Retrieved on: Mar. 27, 2017, 1 page.

\* cited by examiner

UNSUPERVISED LEARNING UTILIZING SEQUENTIAL OUTPUT STATISTICS

BACKGROUND

An important class of problems amenable to machine learning is classification, that is, the unique assignment of input samples to a finite number of categories (or associated output labels) to which they belong. For example, in optical character recognition (OCR), input images assumed to represent characters, such as letters or numbers, receive distinct labels from a finite list of characters (e.g., alphanumeric characters). As another example, in speech recognition tasks, human voice recordings are transcribed into unambiguous text. These and other classification tasks can be automated using a suitable classifier model that either predicts unique output labels for the input samples directly, or specifies a probability distribution over all output labels for each input sample (allowing unique output labels to be determined, e.g., by selecting the label with the greatest probability). In machine learning, the model is initially provided in parametric form, and the parameters of the model are adjusted based on training data. Supervised machine learning utilizes labeled training data in which each of a set of training input samples is paired with a corresponding known output label. Providing a sufficiently large set of such pairs of input sample and output label often requires a significant manual labeling effort. Accordingly, there is a strong interest in unsupervised machine learning approaches that allow training classifiers without labeled training data.

SUMMARY

Described herein is an approach for unsupervised machine learning applicable to classification tasks for which the output is governed by sequential statistics, as is the case, for example, for human-language output. Examples of such classification tasks include, without limitation, OCR, speech recognition, spell checking, and image and video captioning, as well as, outside the realm of human-language output, DNA or protein sequencing.

In accordance with various embodiments, a classifier is modeled by a posterior probability that specifies the probabilities of all output labels for a given input sample. The posterior probability may be trained based on training data including a sequence of input samples and an unaligned sequence of output labels, that is, a sequence of output labels that are not correlated with the input samples (and generally differ in number from the number of input samples). From the sequence of output labels, an N-gram joint probability distribution that specifies the probability of finding subsequences of length N (N-grams) in any sequences of output labels can be estimated. It is to be understood that the training data, instead of including the sequence of output labels, may include the N-gram joint probability distribution directly. The sequential output statistics as reflected in the N-gram joint probability distribution can be exploited to train the classifier by minimizing a cost function that suitably combines the N-gram joint probability distribution with probabilistic predictions of sequences of output labels obtained by the posterior probability from the sequence of input samples. For convenience, a sequence of input samples is herein also referred to as an "input sequence," and a sequence of output labels, whether predicted from an input sequence or unrelated to and obtained independently from an input sequence, is herein also referred to as an "output sequence." In some embodiments, the cost function is or includes the negative cross-entropy of the N-gram joint probability distribution with respect to an expected N-gram frequency in the output sequence predicted by the posterior probability from the input sequence, or a mathematical equivalent of such cross-entropy.

"Minimizing the cost function" is herein understood to encompass solving a mathematically equivalent optimization problem (that is, a problem obtained via suitable transformations of the original problem that can be proven to yield the same solutions as the original problem). For instance, in some embodiments, the original minimization problem is converted to a minimum-maximum problem (that is, the problem of finding the saddle point) for a primal-dual formulation of the original cost function, which is obtained using the convex conjugate function of the original cost function, and which includes, in addition to the original, "primal" parameter(s) of the cost function, a set of (one or more) "dual" parameter(s). The saddle point of the primal-dual formulation may be found using stochastic gradient descent with respect to the primal parameter(s) and stochastic gradient ascent with respect to the dual parameter(s), a method herein termed "stochastic primal-dual gradient method." Beneficially, the primal-dual formulation does not only improve the scalability of the problem by bringing the sum over the input samples outside a logarithmic term in the cross entropy and thereby enabling unbiased stochastic gradients, but also tends to have a more "well-behaved" profile with lower barriers between local optimal solutions and the global optimal solution.

Accordingly, in a first aspect, a method for training a classifier described by a posterior probability in an unsupervised manner is provided. The method involves providing the posterior probability in parametric form with one or more adjustable parameters; obtaining training data comprising a sequence of input samples and an N-gram joint probability distribution for a first sequence of output labels that are not correlated with the input samples; and using a computer processor to iteratively adjust the one or more parameters of the posterior probability to minimize a cost function that includes a negative cross-entropy of the N-gram joint probability distribution with respect to an expected N-gram frequency in a second sequence of output labels predicted by the posterior probability from the sequence of input samples. The cost function may be minimized, in some embodiments; by computing a saddle point of an equivalent primal-dual formulation of the cost function. The saddle point may be computed using a stochastic primal-dual gradient method, which involves initiating primal and dual variables of the primal-dual formulation of the cost function, and iteratively computing stochastic gradients of a component function with respect to the primal and dual variables and updating the primal variables in a direction of gradient descent and the dual variables in a direction of gradient ascent. In computing the stochastic gradients, sample averages may be replaced by randomly sampled components or randomly sampled mini-batch averages. The method may further include, following training of the posterior probability, using the trained posterior probability to assign output labels to a test sequence of input samples. The sequences of output labels may be, for example, sequences of characters or words in a human language, sequences of images; or voice recordings.

Another aspect relates to a machine-readable medium (or multiple machine-readable media) storing instructions for execution by one or more hardware processors that cause the one or more hardware processors to perform operations for training a classifier described by a posterior probability provided in parametric form. The operations include iteratively adjusting parameters of the posterior probability to minimize a cost function based on training data comprising a sequence of input samples and an N-gram joint probability distribution for a first sequence of output labels that are not correlated with the input samples. The cost function includes a negative cross-entropy of the N-gram joint probability distribution with respect to an expected N-gram frequency in a second sequence of output labels, where the second sequence of output labels is predicted by the posterior probability from the sequence of input samples. The cost function may be minimized by computing a saddle point of an equivalent primal-dual formulation of the cost function, e.g., using a stochastic primal-dual gradient method. The operations may further include using the trained posterior probability to assign output labels to a test sequence of input samples.

Yet another aspect provides a system, including one or more hardware processors and one or more machine-readable media storing instructions that, when executed by the one or more hardware processors, cause the one or more hardware processors to perform operations for training a classifier described by a posterior probability, with the operations described above.

This summary section is provided to introduce aspects of embodiments in a simplified form, with further explanation of the embodiments following in the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

The foregoing will be more readily understood from the following detailed description of various embodiments, in particular, when taken in conjunction with the accompanying drawings, in which.

DETAILED DESCRIPTION

Figure 1:
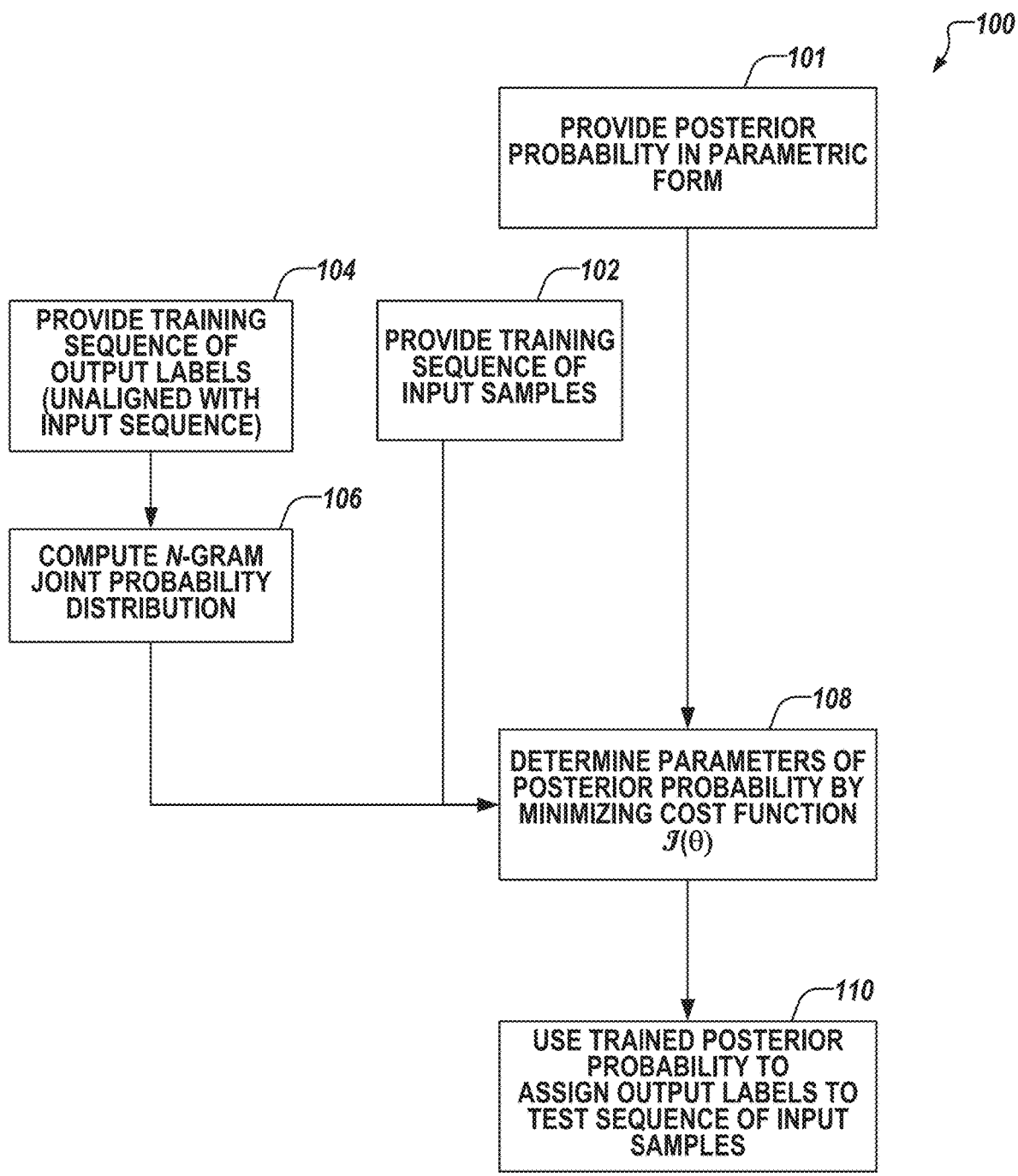
FIG. 1 is a flow chart of an unsupervised learning method exploiting sequential output statistics in accordance with various embodiments.

To formally state the unsupervised learning problem addressed herein, let $x_t$ denote the t-th sample within an input sequence represented as a d-dimensional vector) and let $y_t$ denote the corresponding output label (e.g., represented as a C-dimensional vector). A classifier can generally be described by a posterior probability $p_\theta(y_t|x_t)$ that provides, for each value of the input sample $x_t$, a probability distribution over all possible values of the respective output label $y_t$. In the special case of a hard-decision classifier, that probability distribution is, for any given input sample, equal to one for a single one of the output-label values, and zero everywhere else. In machine learning scenarios as discussed herein, the posterior probability is modeled in parametric form with one or more adjustable parameters, herein collectively denoted by θ, whose values are to be learned based on training data. For example, in some embodiments, the posterior probability is expressed by a log-linear model, $$p_\theta(y_{t=i} | x_t) = \frac{e^{\gamma w_i^T x_t}}{\sum_{j=1}^{C} e^{\gamma w_j^T x_t}},$$

in which $\theta \triangleq \{w_i \in \mathbb{R}^d, i=1, \ldots, C\}$ denotes the collection of adjustable parameters of the posterior probability model. In other embodiments, the posterior probability is modeled with a neural network, and the network weights constitute the adjustable parameters.

In supervised learning, the posterior probability is trained based on labeled training data, that is, pairs of an input sample and a corresponding output label. Given a set of T paired training samples, $\{(x_t, y_t)\}_{t=1}^T$, the problem can be formally stated as follows:

$$\max_\theta \sum_{t=1}^{T} \ln p_\theta(y_t | x_t).$$

In unsupervised learning, by contrast, paired training samples are not available. In accordance with various embodiments, the parameter(s) θ of the posterior probability are, instead, estimated based on a sequence of input data, $X=(x_1, \ldots, x_T)$, and an unaligned (or "uncorrelated") sequence of output labels, $Y=(y_1, \ldots, y_{T'})$, where the number of output labels T' in the output sequence Y need not be, and generally is not, equal to the number of samples T in the input sequence.

In accordance herewith, the sequence of output labels Y is assumed to admit sequential structure, that is to say, the probability of a particular output label or contiguous subsequence of output labels in the output sequence generally depends on the preceding output label or subsequence. In human-language output, for instance, a sequence of characters is not a sequence of letters randomly sampled from the alphabet; rather, certain subsequences of letters occur more frequently than others, e.g., by virtue of forming or being part of commonly used words. Similarly, sequences of words in natural human-language output are not random, but follow certain sequential output statistics. As will be readily appreciated, such sequential output statistics are language-specific. For any particular language, its sequential output statistics can be derived, at least approximately, from any text (or texts) in that particular language (allowing for some statistical variations based on style, topic, etc.). The types of output data subject to sequential output statistics are, of course, not limited to human-language output; they also include, as just another example, biopolymers such as DNAs or proteins.

The unsupervised training approach described herein exploits sequential output statistics to learn a posterior probability model for a given classification problem. For this purpose, the output statistics may be characterized by an N-gram joint probability distribution estimated from a sequence Y of output labels suitable for the problem. The N-gram joint probability distribution specifies, for a given value of N, the probability of each ordered combination of output labels that form a (sub-)sequence of length N:

$$p_{LM}(y_{t-N+1}=i_1, \ldots, y_t=i_t) = p_{LM}(i_1, \ldots, i_N)$$

Herein, "LM" stands for "language model," indicating that the N-gram joint probability distribution depends on, and models a characteristic of, a particular type of output data, such as, but not limited to, output in a particular language. Hereinafter, N-gram joint probability distributions, or mathematically equivalent formulations thereof, are also referred to as N-gram language models.

Accordingly, instead of using paired input-output samples, the posterior probability $p_\theta(y_t|x_t)$ is trained, in accordance with various embodiments, based on an N-gram joint-probability distribution $p_{LM}(i_1, \ldots, i_N)$, which can be obtained independently of input data with low (if any) cost. This approach is useful in many practical problems where the output has strong sequence structure. For example, in OCR tasks performed for English text, English-character output $y_t$ is to be determined based on input images $x_t$ depicting certain characters. In this scenario, the character-level N-gram language model can be obtained from a separate text corpus, and then the classifier can be trained using the input images and the estimated N-gram language model, without any aligned input-output pairs.

The quality of a classification achieved by a given posterior probability can be evaluated by, broadly speaking, measuring the linguistic probability of its typical outputs using the language model as reflected in the N-grain joint probability distribution. This linguistic probability can be captured with a suitable cost function (where lower linguistic probabilities of a predicted output are penalized by a larger contribution to the cost function). Accordingly, training the classifier based on the N-gram language model generally involves minimizing a suitable cost function (or solving a mathematically equivalent optimization problem). Before introducing the cost function proposed herein, consider the following cost function:

$$\mathbb{E}\left[-\ln p_{LM}(y_1, \ldots, y_T)|x_1, \ldots, x_T\right] \triangleq$$

$$-\Sigma_{(y_1, \ldots, y_T)} \Pi_{t=1}^T p_\theta(y_t|x_t) \ln p_{LM}(y_1, \ldots, y_T) \quad (1)$$

where the sum is over all possible combinations of values for $(y_1, \ldots, y_T)$. This cost function, which can be described as "the expected negative log-likelihood of the posterior probability," can be interpreted as follows: For a given input sequence $x_1, \ldots, x_T$, let a sequence sampled from the distribution $\Pi_{t=1}^T p_\theta(y_t|x_t)$, which is the parametric posterior probability to be learned. Then, the estimated N-gram joint probability distribution can measure the quality of the sampled output sequence (by assigning to it a negative log-likelihood: $-\ln p_{LM}(y_1, \ldots, y_T)$. The above cost function (1) is the resulting expected score of the output sequences generated from the predictor $$\Pi_{t=1}^T p_\theta(y_t|x_t).$$

To analyze the behavior of this cost function, it is beneficial to rewrite it in the following mathematically equivalent form:

$$-T\Sigma i_1, \ldots, i_N \in \{1, \ldots, c\} \, \bar{p}_\theta(i_1, \ldots, i_N) \ln p_{LM}(i_N|i_{N-1}, \ldots, i_1) \quad (2)$$

Herein, $p_{LM}(i_N|i_{N-1}, \ldots, i_1)$ denotes the conditional probability that $y_t|i_N$ given $y_{t-1}=i_{N-1}, \ldots, y_{t-N+1}=i_1$ (herein also referred to as the "conditional N-gram probability distribution"), and $$\bar{p}_\theta(i_1, \ldots, i_N) \triangleq \frac{1}{T}\sum_{t=1}^{T}\prod_{k=0}^{N-1} p_\theta(y_{t-k}=i_{N-k}|x_{t-k}) \quad (3)$$

can be interpreted as the expected frequency of the N-gram $(i_1, \ldots, i_N)$ in the output sequence $(y_1, \ldots, y_T)$ when applying $\Pi_{t=1}^T p_{74}(y_t|x_t)$ to the training input sequence $(x_1, \ldots, x_T)$ (in other words, the expected N-gram frequency in the sequence of output labels predicted by the posterior probability from the sequence of input samples). This cost function is the negative cross entropy of the expected N-gram frequency $\bar{p}_\theta(i_1, \ldots, i_N)$ with respect to the conditional N-gram probability distribution $p_{LM}(i_N|i_{N-1}, \ldots, i_1)$.

To gain insight into the general behavior of this cost function, consider the extreme cases in which either the conditional N-gram probability distribution or the expected N-gram-frequency approaches zero:

For $p_{LM}(i_N|i_{N-1}, \ldots, i_1) \to 0$ and $\bar{p}_\theta(i_1, \ldots, i_N) > 0$:
$-\bar{p}_\theta(i_1, \ldots, i_N) \ln p_{LM}(i_N|i_{N-1}, \ldots, i_1) \to +\infty$.

For $\bar{p}_\theta(i_1, \ldots, i_N) \to 0$ and $p_{LM}(i_N|i_{N-1}, \ldots, i_1) > 0$:
$-\bar{p}_\theta(i_1, \ldots, i_N) \ln p_{LM}(i_N|i_{N-1}, \ldots, i_1) \to 0$.

These limits show that the above cost function heavily penalizes the classifier if it predicts an output that the N-gram language model deems rather improbable. On the other hand, the cost function does not penalize the classifier when it fails to predict an output that is probable under the N-gram language model. In other words, the classifier is encouraged to be "conservative" in that it predicts outputs with high probability under the N-gram language model. As a result, as has been observed in practice, the posterior probability, when trained based on this cost function in the absence of any added generative regularization terms, tends to converge to trivial optimal solutions that predict the same set of output sequences namely, high-probability sequences under the N-gram language model regardless of the input sequences.

In accordance with various embodiments, this undesirable behavior of the cost function is avoided by swapping the expected N-gram-frequency $\bar{p}_\theta(i_1, \ldots, i_N)$ and the conditional N-gram probability distribution $p_{LM}(i_N|i_{N-1}, \ldots, i_1)$ to obtain the negative cross entropy of the conditional N-gram probability distribution $p_{LM}(i_N|i_{N-1}, \ldots, i_1)$ with respect to the expected N-gram-frequency $\bar{p}_\theta(i_1, \ldots, i_N)$:

$$\Sigma i_1, \ldots, i_N \in \{1, \ldots, C\} \, p_{LM}(i_N|i_{N-1}, \ldots, i_1) \ln \bar{p}_\theta(i_1, \ldots, i_N) \quad (1)$$

Repeating the above analysis, we see that, in this case:
For $p_{LM}(i_N|i_{N-1}, \ldots, i_1) \to 0$ and $\bar{p}_\theta(i_1, \ldots, i_N) > 0$:
$-\bar{p}_\theta(i_N|i_{N-1}, \ldots, i_1) \ln p_{LM}(i_1, \ldots, i_N) \to 0$.
For $\bar{p}_\theta(i_1, \ldots, i_N) \to 0$ and $p_{LM}(i_N|i_{N-1}, \ldots, i_1) > 0$:
$-p_{LM}(i_N|i_{N-1}, \ldots, i_1) \ln \bar{p}_\theta(i_1, \ldots, i_N) \to +\infty$.

This modified cost function penalizes the classifier if it fails to predict the output that the N-grain language model deems probable, but not if the classifier predicts an output that is improbable under the N-gram language model. Thus, the classifier is encouraged to trust the N-gram language model more if $p_{LM}(i_N|i_{N-1}, \ldots, i_1)$ is large and less otherwise. This makes sense since, in practice, small values of $p_{LM}(i_N|i_{N-1}, \ldots, i_1)$ tend to be less reliable as they are estimated from fewer samples. It has been found that this modified cost function is more robust and less inclined to learn trivial solutions.

In accordance with some embodiments, the above-stated modified cost function is further improved by replacing the uniform sum over $i_1$ through $i_{N-1}$ by a weighted sum with weights $p_{LM}(i_1, \ldots, i_{N-1})$, which effectively accounts for the non-uniform distribution of $p_{LM}(i_1, \ldots, i_{N-1})$. This modification yields the following cost function $\mathcal{J}(\theta)$:

$$\mathcal{J}(\theta) = -\sum_{i_1,\ldots,i_{N-1}} p_{LM}(i_1, \ldots, i_{N-1}) \quad (4)$$
$$\sum_{i_N} p_{LM}(i_N | i_{N-1}, \ldots, i_1) \times \ln \overline{p}_\theta(i_1, \ldots, i_N)$$
$$= -\sum_{i_1,\ldots,i_N} p_{LM}(i_1, \ldots, i_N) \times \ln \overline{p}_\theta(i_1, \ldots, i_N).$$

The cost function $\mathcal{J}(\theta)$, which depends on the adjustable parameters $\theta$ of the posterior probability $p_\theta(y_t|z_t)$, can be described as the negative cross-entropy of the N-gram joint probability distribution with respect to $p_\theta(i_1, \ldots, i_N)$, the expected N-gram frequency in an output sequence predicted by the posterior probability from an input sequence.

As will be readily understood by those of ordinary skill in the art, the cost function $\mathcal{J}(\theta)$ can be expressed in various ways, as well as slightly modified without affecting the values of $\theta$ obtained through its optimization. For example, the cross-entropy in $\mathcal{J}(\theta)$ may be substituted by the well-known Kullback-Leibler divergence, which can be shown to differ from the cross-entropy merely by a constant term that has no effect on the optimal values of $\theta$ and is, in that sense, mathematically equivalent to the cross-entropy. In the following, $\mathcal{J}(\theta)$ and the "negative cross-entropy of the AT-gram joint probability distribution with respect to an expected. N-gram frequency in a sequence of output labels predicted by the posterior probability from the sequence of input samples" are intended to encompass such mathematically equivalent formulations.

FIG. 1 illustrates an unsupervised learning method 100 that exploits sequential output statistics, using the cost function $\mathcal{J}(\theta)$, to train a classifier described by a posterior probability. The method can be implemented, for example, with software executing on a general-purpose computing machine (e.g., as described below with respect to FIG. 6), or more generally using any suitable combination of hardware, firmware, and software. The method 100 involves providing the posterior probability in parametric form (act 101) as well as training data. The training data includes a (training) sequence of input samples (provided in act 102), and an unaligned sequence of output labels (provided in act 104) from which an N-gram joint probability distribution can be computed (in act 106). The output sequence may generally be obtained from any corpus of content of the expected output type. For example, for classification tasks with text output in a particular human language, the output sequence may be a text document, or a collection of multiple text documents, written in that language. It will be appreciated that, since the sequence of output labels is not aligned or correlated with the input sequence, the N-gram joint probability distribution can be precomputed, and stored for retrieval at the time the input sequence becomes available. From the provided training data, the cost function $\mathcal{J}(\theta)$ can be established, and the posterior probability $p_\theta(y_t|x_t)$ can then be trained by ascertaining values of the parameter(s) $\theta$ that minimize the cost function $\mathcal{J}(\theta)$ (act 108). Once trained, the posterior probability can be used to assign output labels to any (test) sequence input samples (act 110).

In computing the N-gram joint probability distribution (act 106), the length N of the N-grams may be selected based on heuristic notions and/or empirical data regarding the effect of N on the accuracy of the N-gram joint probability distribution and, ultimately, the performance of the classifier. For example, one factor to be considered is the length of the available sequence of output labels from which the Ar-gram joint probability is derived: for larger values of N, a larger output sequence is generally needed to ensure a reliable estimate for the N-gram joint probability distribution. Further, while, in the above cost function $\mathcal{J}(\theta)$, N takes a particular value, it is possible to combine cost functions for different values of N into a single aggregate cost function, which can thereafter be minimized in the same manner as the cost function for a single value of N.

In various embodiments, the cost function $\mathcal{J}(\theta)$ is minimized indirectly by solving a different, but mathematically equivalent optimization problem to circumvent practical difficulties encountered when minimizing the cost function directly. To gain an appreciation for these difficulties, consider the following expression for the cost function (obtained by substituting $\overline{p}_\theta(i_1, \ldots, i_N)$ in (4) by the expression (3)):

$$\mathcal{J}(\theta) = -\sum_{i_1,\ldots,i_N} p_{LM}(i_1, \ldots, i_N) \ln\left(\frac{1}{T}\sum_{t=1}^{T}\prod_{k=0}^{N-1} p_\theta(y_{t-k} = i_{N-k} | x_{t-k})\right).$$

One of the challenges with this expression is that, in contrast to traditional empirical risk minimization problems where the sum is outside the logarithmic loss, the sample average in $\mathcal{J}(\theta)$ appears inside the logarithmic loss, precluding application of the known stochastic gradient descent method to minimize the cost function. This can be seen from the following expression for the gradient of $\mathcal{J}(\theta)$:

$$\nabla_\theta \mathcal{J}(\theta) = -\sum_{i_1,\ldots,i_N} p_{LM}(i_1, \ldots, i_N) \frac{\frac{1}{T}\sum_{t=1}^{T}\nabla_\theta\left(\prod_{k=0}^{N-1} p_\theta(y_{t-k} = i_{N-k} | x_{t-k})\right)}{\frac{1}{T}\sum_{t=1}^{T}\prod_{k=0}^{N-1} p_\theta(y_{t-k} = i_{N-k} | x_{t-k})}.$$

This expression has sample averages in both the numerator and the denominator. Therefore, the full-batch gradient method is less scalable, as it needs to go over the entire training set to compute $\nabla_\theta \mathcal{J}(\theta)$ at each update. To apply stochastic gradient descent, an unbiased estimate may be obtained by sampling the numerator with a single component while keeping the denominator the same:

$$-\sum_{i_1,\ldots,i_N} p_{LM}(i_1, \ldots, i_N) \frac{\nabla_\theta\left(\prod_{k=0}^{N-1} p_\theta(y_{t-k} = i_{N-k} | x_{t-k})\right)}{\frac{1}{T}\sum_{t=1}^{T}\prod_{k=0}^{N-1} p_\theta(y_{t-k} = i_{N-k} | x_{t-k})}.$$

This estimate, however, is still not scalable, as the average over the entire training set is needed at each update to compute the denominator. On the other hand, sampling both the numerator and the denominator, in accordance with $$-\sum_{i_1,\ldots,i_N} p_{LM}(i_1,\ldots,i_N) \frac{\nabla_\theta \left(\prod_{k=0}^{N-1} p_\theta(y_{t-k} = i_{N-k} | x_{t-k})\right)}{\prod_{k=0}^{N-1} p_\theta(y_{t-k} = i_{N-k} | x_{t-k})},$$

results in a biased estimate, which has been experimentally shown to perform poorly on the unsupervised learning problem.

Figure 2A:
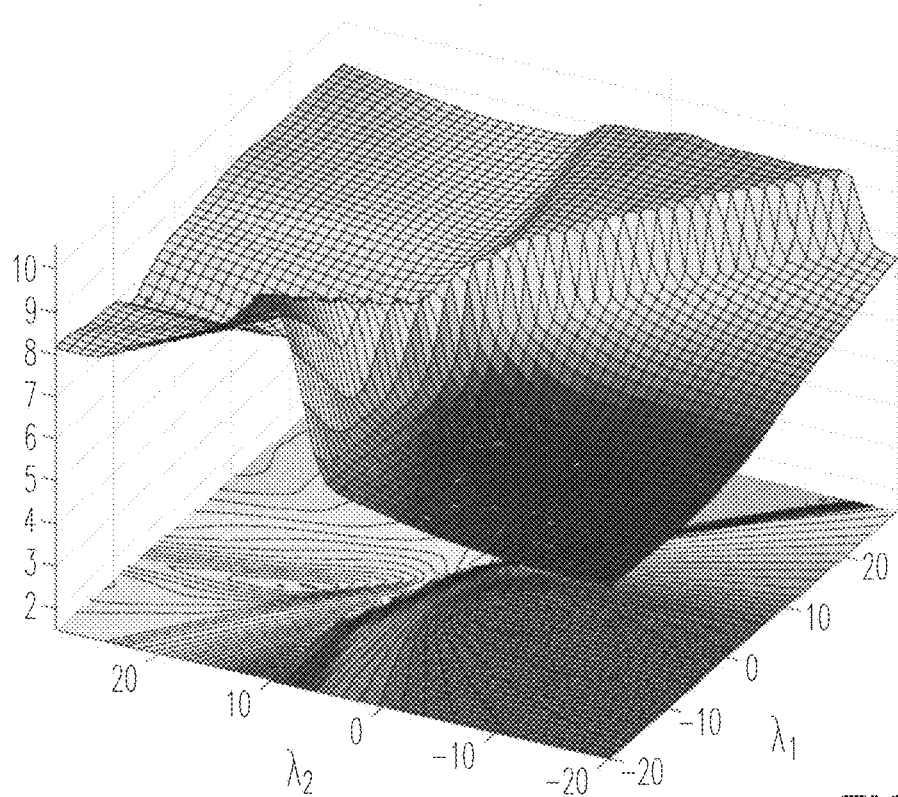
FIGS. 2A-2C are graphs illustrating, from three different angles, a profile of an example cost function in accordance herewith, evaluated for an OCR data set, in a two-dimensional affine space.
Figure 2B:
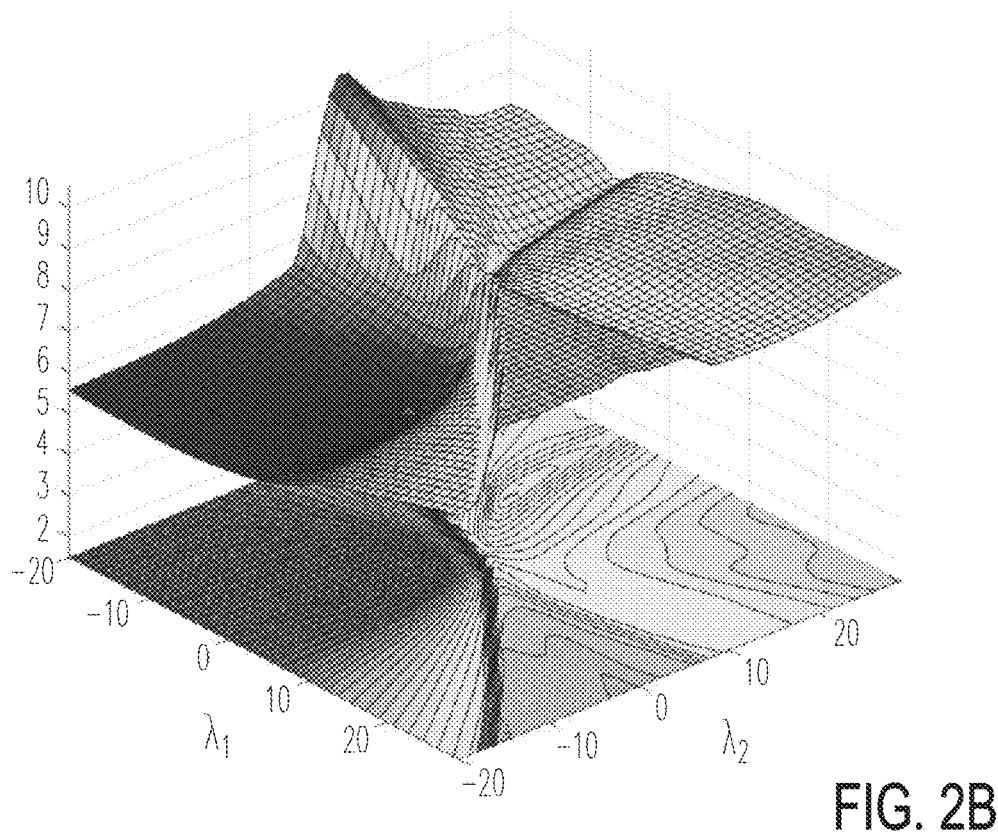
Figure 2C:
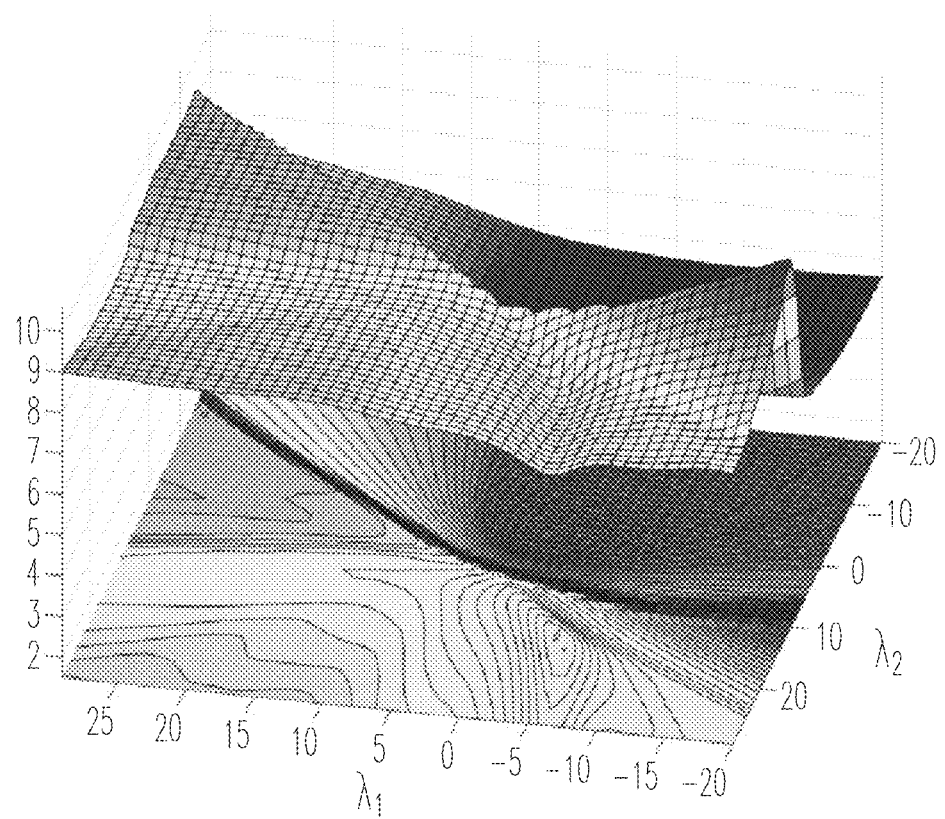

A further difficulty of minimizing the cost function $\mathcal{J}(\theta)$ directly is illustrated in FIGS. 2A-2C, which show, from three different angles, a profile of an example cost function $\mathcal{J}(\theta)$ for a log-linear classifier, evaluated for an OCR data set. Evidently, since $\mathcal{J}(\theta)$ is a high-dimensional function, it cannot be fully visualized; accordingly, the graphs in FIGS. 2A-2C constitute only a partial visualization. To obtain this partial visualization, the optimal solution θ* is first determined by solving the supervised learning problem, which is, for linear classifiers, a convex optimization problem with a global optimal solution. Using two randomly generated parameter vectors $\theta_1$ and $\theta_2$, the two-dimensional function $\mathcal{J}(\theta^* + \lambda_1(\theta_1 - \theta^*) + \lambda_2(\theta_2 - \theta^*))$ is then plotted with respect to $\lambda_1, \lambda_2 \in \mathbb{R}$; this representation corresponds to a slice of the cost function on the two-dimensional affine space spanned by $\theta_1 - \theta^*$ and $\theta_2 - \theta^*$ and translated by vector θ*. FIGS. 2A-2C show such a slice from three different angles. As can be seen, the cost function $\mathcal{J}(\theta)$ is highly non-convex even with a linear classifier. It has local optimal solutions with high barriers between the local optimal solutions and the global optimal solution θ* determined by supervised learning. Minimizing this cost function directly is very difficult as it is hard to cross the high barriers to reach the global optimal solution in cases where the parameter(s) θ* are not initialized close to the global optimized solution at the outset.

In accordance with various embodiments, the cost function $\mathcal{J}(\theta)$ is reformulated to bring the sample average outside the logarithmic loss, as well as, in many cases, render the profile of the reformulated cost function smoother and easier to work with. A suitable reformulation can be achieved using a convex conjugate function. For a given convex function $f(u)$, its convex conjugate function $f^*(v)$ is defined as $$f^*(v) = \sup_u (v^T u - f(u)).$$

It can be shown that, conversely, $$f(u) = \sup_v (u^T v - f^*(v)).$$

Considering a function $f(u) = -\ln u$ where u is a scalar, the corresponding conjugate function is $f^*(v) = -1 - \ln(-v)$ with $v < 0$. It follows that $$f(u) = -\ln u = \max_v (uv + 1 + \ln(-v)), \quad (5)$$

where the supremum (sup) is replaced by the maximum (max) because the supremum is attainable. Substituting this expression (5) into the equation (4) for $\mathcal{J}(\theta)$, the original minimization problem, $$\min_\theta \{\mathcal{J}(\theta)\},$$

can be shown to be equivalent to the following minimum-maximum problem:

$$\min_\theta \max_{\{v_{i_1},\ldots,i_N\}} \{\mathcal{L}(\theta, V)\} \quad (6)$$

with $$\mathcal{L}(\theta, V) \triangleq \frac{1}{T} \sum_{t=1}^T L_t(\theta, V) + \sum_{i_1,\ldots,i_N} p_{LM}(i_1,\ldots,i_N) \ln(-v_{i_1,\ldots,i_N}),$$

where $V \triangleq \{v_{i_1},\ldots,i_N\}$ is a collection of all the dual variables $v_{i_1},\ldots, i_N(\theta, V)$ is the t-th component function:

$$L_t(\theta, V) \triangleq \sum_{i_1,\ldots,i_N} p_{LM}(i_1,\ldots,i_N) v_{i_1,\ldots,i_N} \times \prod_{k=0}^{N-1} p_\theta(y_{t-k} = i_{N-k} | x_{t-k}).$$

The minimum-maximum problem (6) is herein referred to as the primal-dual formulation of the original minimization problem, and the function $\mathcal{L}(\theta, V)$ as the primal-dual formulation of the cost function. The optimal solution (θ', V*) of the minimum-maximum problem (6) is called the saddle point of $\mathcal{L}(\theta, V)$. Once (θ*, V*) is obtained, the primal variables θ' can be kept as the learned parameters of the posterior probability.

Figure 3:
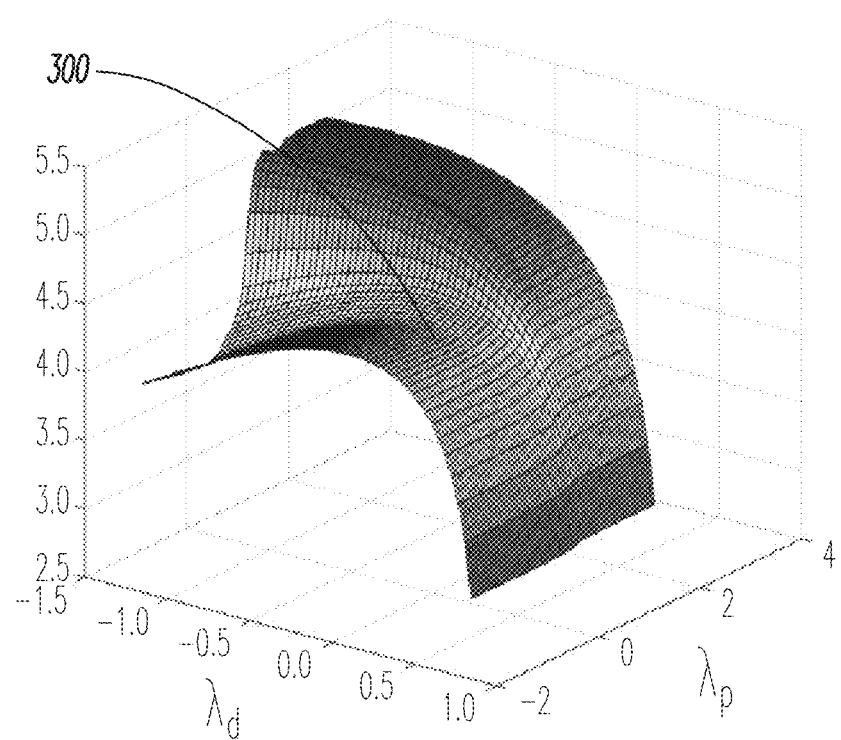
FIG. 3 is a graph illustrating a profile of a primal-dual formulation, in accordance herewith, of the example cost function of FIGS. 2A-2C in a two-dimensional affine space.

FIG. 3 shows a profile of a primal-dual formulation of the example cost function of FIGS. 2A-2C in a two-dimensional affine space. To visualize the function $\mathcal{L}(\theta, V)$, similarly to the case of $\mathcal{J}(\theta)$, the supervised learning problem is first solved to obtain the optimal solution θ* and then the optimal dual variables $V^* \triangleq \{v^*_{i_1},\ldots, i_N\}$ determined by maximizing $\mathcal{L}(\theta, V)$ with respect to $v_{i_1},\ldots, i_N$ with θ=θ*, for which $$v^*_{i_1,\ldots,i_N} = -\frac{1}{\frac{1}{T}\sum_{t=1}^T \prod_{k=0}^{N-1} p_{\theta^*}(y_{t-k} = i_{N-k} | x_{t-k})}.$$

Then, values for $\theta_1$ and $V_1$ are randomly generated (with the elements of $V_1$ being negative), and $\mathcal{L}(\theta^* + \lambda_p(\theta_1 - \theta^*), V^* + \lambda_d(V_1 - V^*))$ is plotted far different values of $\lambda_p, \lambda_d \in \mathbb{R}$. The optimal solution is at the saddle point 300 of the profile. Comparing FIG. 3 to FIGS. 2A-2C, it can be seen that the profile of $\mathcal{L}(\theta, V)$ is much smoother than that of $\mathcal{J}(\theta)$, and the barrier in the profile of $\mathcal{L}(\theta, V)$ is much lower.

Figure 4:
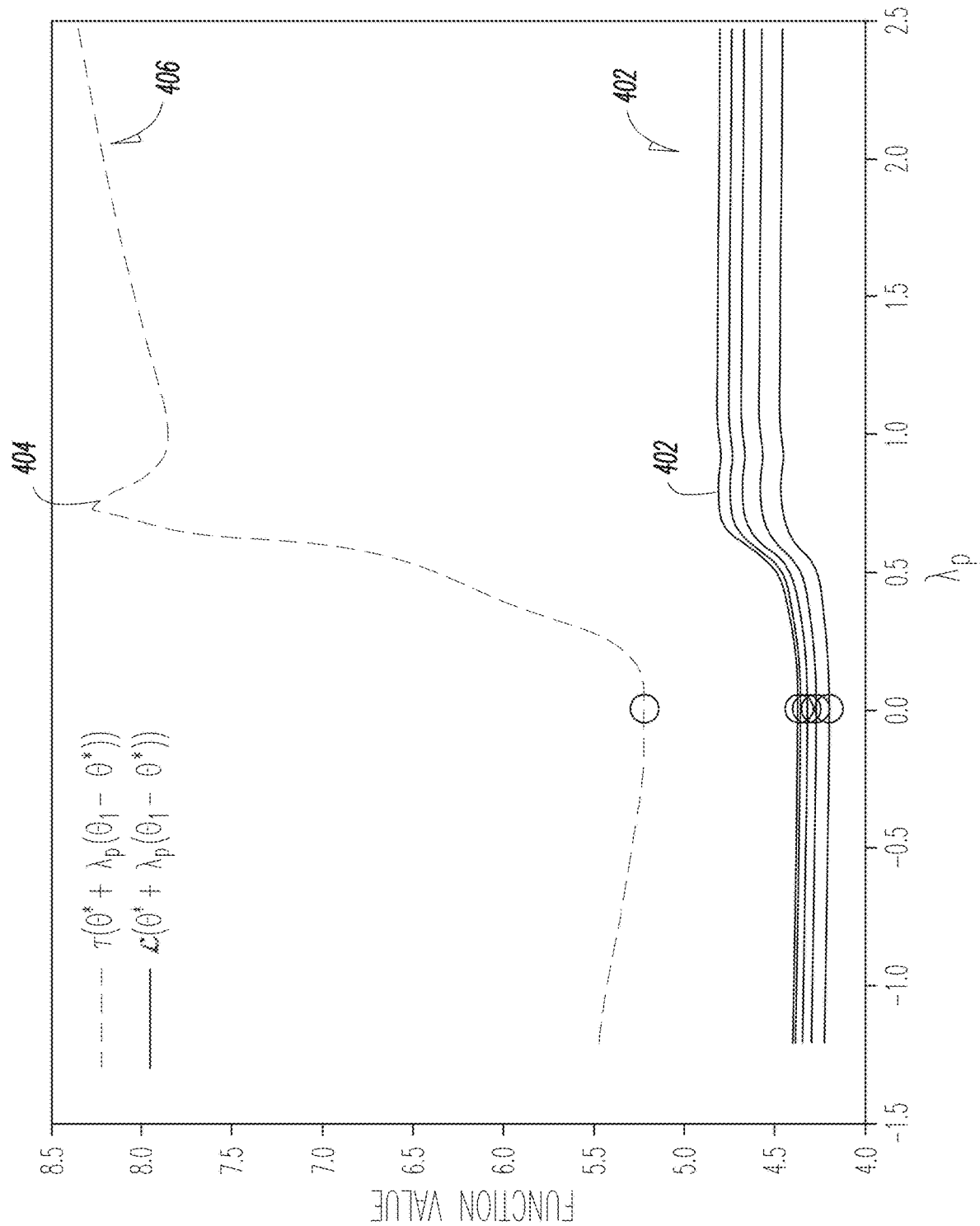
FIG. 4 is graph comparing the profiles of the example cost function of FIGS. 2A-2C and its primal-dual formulation of FIG. 3 in a one-dimensional space.

For further comparison between the profiles of the example cost function of FIGS. 2A-2C and its primal-dual formulation of FIG. 3, FIG. 4 shows $\mathcal{J}(\theta)$ and $\mathcal{L}(\theta, V)$ plotted, in one-dimensional space, along the same line $\theta^* + \lambda_p(\theta_1 - \theta^*)$ for $\lambda_p \in \mathbb{R}$. This plot confirms that the barrier 400 of $\mathcal{L}(\theta, V)$ (402) along the primal direction is lower than the barrier 404 of $\mathcal{J}(\theta)$ (406). These observations imply that, with the introduction of auxiliary dual variables, the cost function tends to become much better conditioned to work with, rendering the minimum-maximum problem of the primal-dual formulation easier to solve than the original minimization problem.

Solving the minimum-maximum problem (6) to find the optimal solution (θ*, V*) involves minimizing $\mathcal{L}(θ, V)$ with respect to θ and maximizing $\mathcal{L}(θ, V)$ with respect to V. Since the sample average in $\mathcal{L}(θ, V)$ is the average over T component functions $L_t$ evaluated for separate respective subsequences $(x_{t-N+1}, \ldots, x_t)$ of the input sequence, an unbiased estimate can be obtained by randomly sampling the sample average with a single component function. Accordingly, the minimization with respect to θ and the maximization with respect to V can be achieved by stochastic gradient descent of $\mathcal{L}(θ, V)$ with respect to the primal variable(s) θ and stochastic gradient ascent of $\mathcal{L}(θ, V)$ with respect to the dual variable(s) V; this method is herein referred to as the stochastic primal-dual gradient (SPDG) method. The full-batch gradients of $\mathcal{L}(θ, V)$ can be expressed as:

$$\frac{\partial \mathcal{L}}{\partial θ} = \frac{1}{T}\sum_{t=1}^{T} \frac{\partial L_t}{\partial θ}, \text{ and}$$

$$\frac{\partial \mathcal{L}}{\partial V} = \frac{1}{T}\sum_{t=1}^{T} \frac{\partial L_t}{\partial V} + \frac{\partial}{\partial V} \sum_{i_1, \ldots, i_N} p_{LM}(i_1, \ldots, i_N) \ln(-v_{i_1, \ldots, i_N}).$$

To obtain the stochastic gradients, the sample averages of $\partial L_t/\partial θ$ and $\partial L_t/\partial V$ over t may be replaced by the gradients of respective randomly sampled component functions, $\partial L_{t_m}/\partial θ$ and $\partial L_{t_m}/\partial V$, where $t_m$ is a uniform random variable over $\{1, \ldots, T\}$, or, alternatively, by mini-batch averages over the gradients of B randomly sampled component functions:

$$\frac{\partial \mathcal{L}}{\partial θ} \cong \frac{1}{B}\sum_{m=1}^{B} \frac{\partial L_{t_m}}{\partial θ}, \text{ and}$$

$$\frac{\partial \mathcal{L}}{\partial V} \cong \frac{1}{B}\sum_{m=1}^{B} \frac{\partial L_{t_m}}{\partial V} + \frac{\partial}{\partial V} \sum_{i_1, \ldots, i_N} p_{LM}(i_1, \ldots, i_N) \ln(-v_{i_1, \ldots, i_N}).$$

Figure 5:
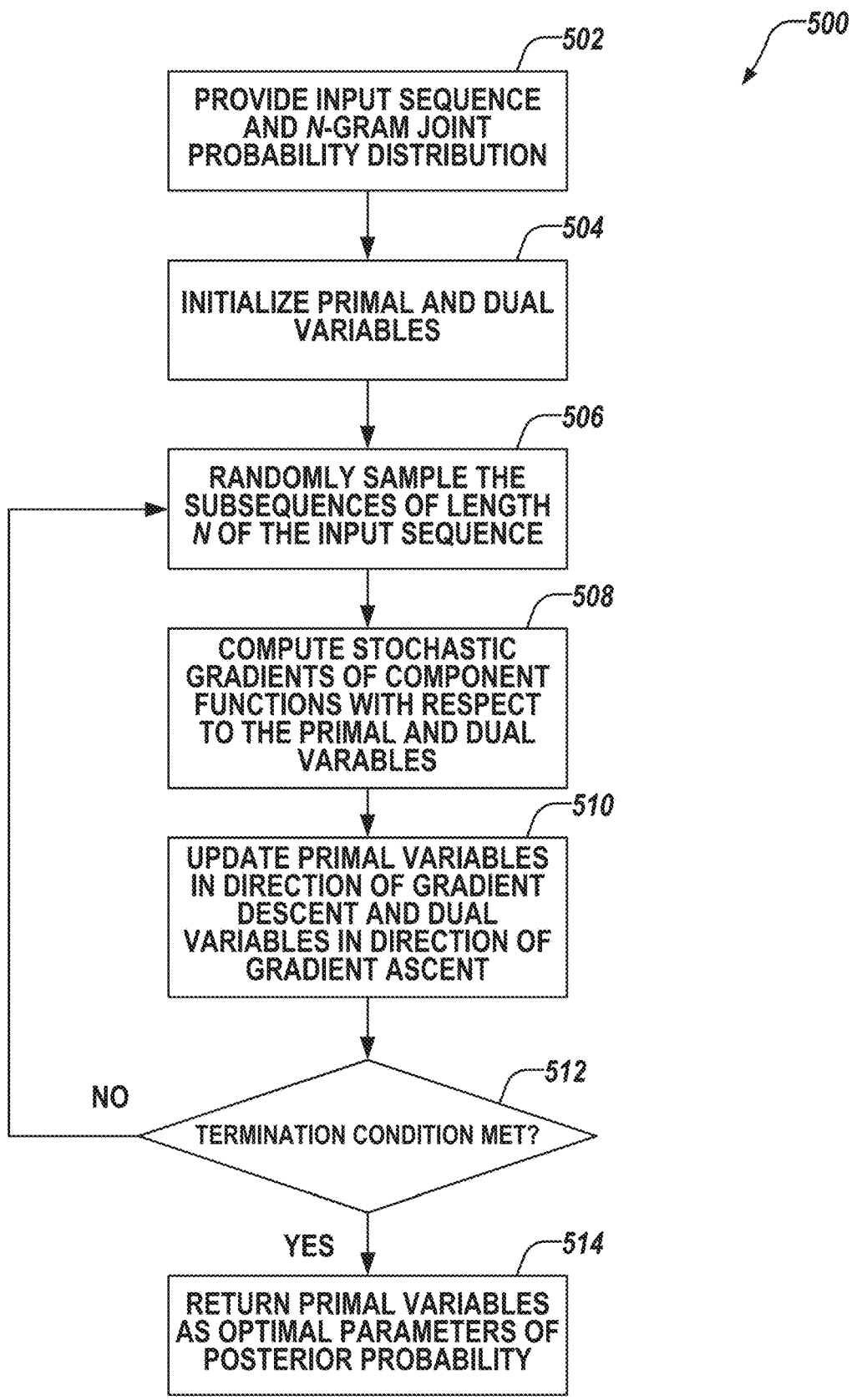
FIG. 5 is a flow chart of a method for optimizing the primal-dual formulation of the cost function, in accordance with various embodiments.

Referring now to the flow chart of FIG. 5, a method 500 for solving the minimum-maximum problem for $\mathcal{L}(θ, V)$ using stochastic dual-gradient descent is illustrated. The optimization begins, when the input sequence and N-gram joint probability distribution have been provided (in act 502, corresponding to acts 102, 104, 106 of FIG. 1), by initializing the primal and dual variables θ and V (with negative values for the elements of V) (act 504). In an iterative procedure, the primal and dual variables are then adjusted towards the optimal solution. In each iteration, the subsequences of length N of the input sequence are randomly sampled to obtain sample subsequences $(x_{t-N+1}, \ldots, x_t)$ for one or (in the case of mini-batch averages) more values of t (act 506), and stochastic gradients with respect to the primal and dual variables are computed by evaluating the component-wise gradients $\partial L_t/\partial θ$ and $\partial L_t/\partial V$ for the multiple values of t and, if applicable, averaging over t (act 508). Based on the stochastic gradients, the primal variables are then updated in the direction of decreasing gradient, and the dual variables are updated in the direction of increasing gradient (act 510). The sampling, computation of stochastic gradients, and updating of the primal and dual variables (acts 506, 508 510) are then repeated until convergence is reached (where convergence may be defined, e.g., by a relative change between variable values of successive iterations below a specified percentage threshold) or some other termination condition (evaluated in act 512) is met. At that time, the values of the primal variables are returned as the optimal parameter values of the posterior probability (act 514).

To illustrate the performance achievable with some embodiments of the instant method, the below table shows empirical classification error rates obtained using the SPDG method to optimize $\mathcal{L}(θ, V)$ as described herein, in comparison with respective error rates obtained with a conventional stochastic gradient descent (SGD) method (using mini-batch averages of various sizes) to optimize the original cost function $\mathcal{J}(θ)$ as well as through supervised learning and guess by majority rule (method indicated in first column). Error rates are shown for two classification tasks and corresponding data sets: (1) an OCR task performed on segmented data of English-language documents publicly available from the UWIII English Document Image Database, using a language model derived from portions of the public English Gigaword database (second column); and (2) a spelling-correction task performed on misspellings generated by substitution simulation in a portion of the English Gigaword database (third column). As can be seen, for both data sets, the error rates achieved with SPDG as described herein are significantly lower than those obtained with SGD for various mini-batch sizes (by factors of about 5-8 for OCR, and factors of 20-40 for spelling correction). Further, the error rate achieved by unsupervised learning using SPDG is only about twice that obtained by supervised learning. This data provides evidence of the effectiveness of the method described herein for unsupervised classification.

The operations, algorithms, and methods described herein may generally be implemented in suitable combinations of software, hardware, and/or firmware, and the provided functionality may be grouped into a number of components, modules; or mechanisms. Examples of modules include, without limitation, the input-output encoder and program-generation model. Modules can constitute either software modules (e.g., code embodied on a non-transitory machine-readable medium) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 6:
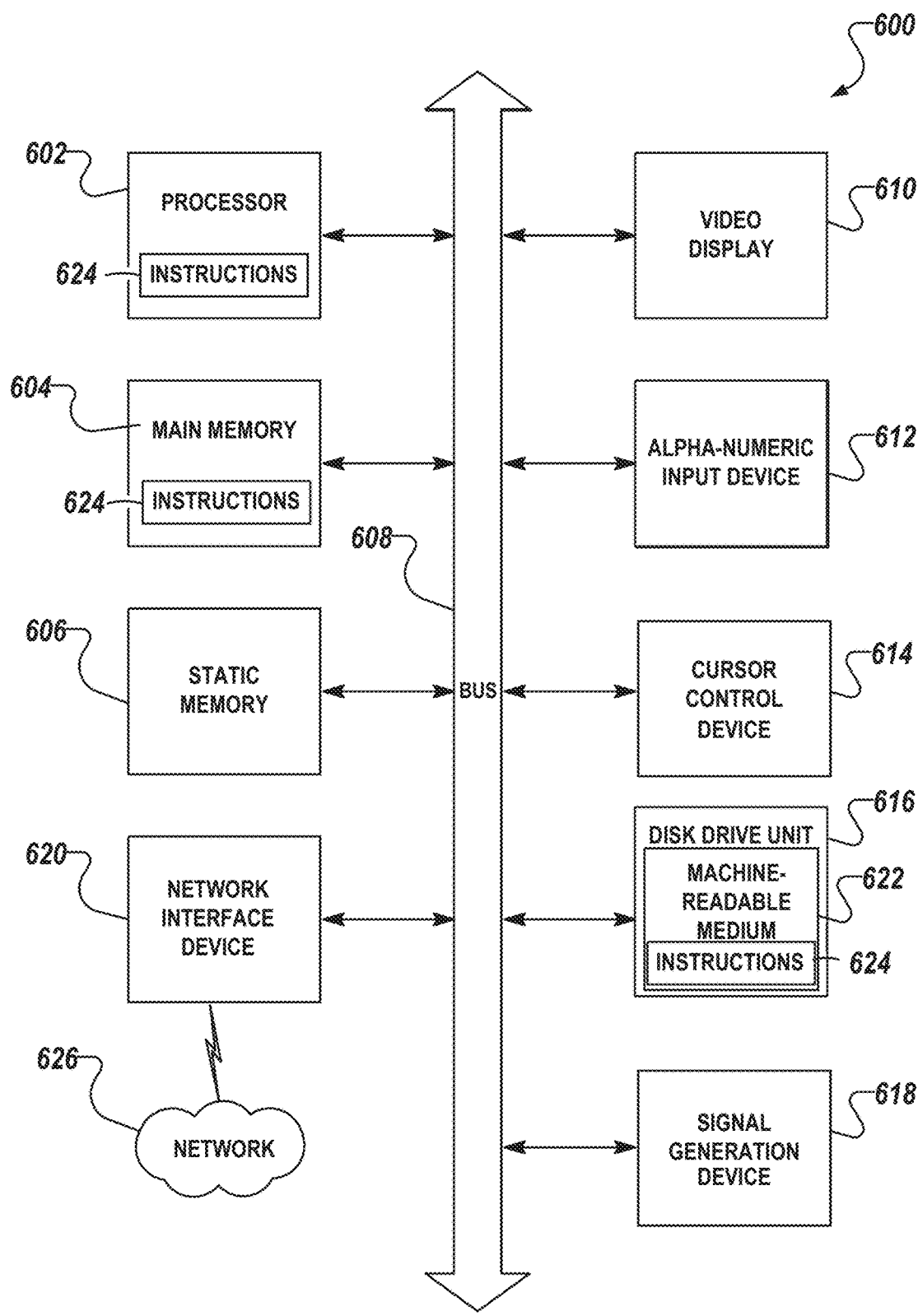
FIG. 6 is a block diagram of a machine in the example form of a computer system within which instructions may be executed to cause the machine to perform any one or more of the methodologies discussed herein.

FIG. 6 is a block diagram of a machine in the example form of a computer system 600 within which instructions 624 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 can further include a video display 610 (e.g., a liquid crystal display (LCD) or a cathode ray tube (CRT)). The computer system 600 also includes an alpha-numeric input device 612 (e.g., a keyboard or a touch-sensitive display screen), a user interface (UI) navigation (or cursor control) device 614 (e.g., a mouse), a disk drive unit 816, a signal generation device 618 (e.g., a speaker), and a network interface device 620.

The disk drive unit 616 includes a machine-readable medium 622 on which are stored one or more sets of data structures and instructions 624 (e.g., software) embodying or utilized by any one or more of the methodologies or functions described herein. The instructions 624 can also reside, completely or at least partially, within the main memory 604 and/or within the processor 602 during execution thereof by the computer system 600, with the main memory 604 and the processor 602 also constituting machine-readable media.

While the machine-readable medium 622 is shown in an example embodiment to be a single medium, the term "machine-readable medium" can include a single medium or multiple media (e.g., a centralized or distributed database, and/or associated caches and servers) that store the one or more instructions 624 or data structures. The term "machine-readable medium" shall also be taken to include any tangible medium that is capable of storing, encoding, or carrying instructions 624 for execution by the machine and that cause the machine to perform any one or more of the methodologies of the present disclosure, or that is capable of storing, encoding, or carrying data structures utilized by or associated with such instructions 624. The term "machine-readable medium" shall accordingly be taken to include, but not be limited to, solid-state memories, and optical and magnetic media. Specific examples of machine-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 624 can be transmitted or received over a communication network 626 using a transmission medium. The instructions 624 can be transmitted using the network interface device 620 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 624 for execution by the machine, and includes digital or analog communications signals or other intangible media to facilitate communication of such software.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method for training a classifier described by a posterior probability in an unsupervised manner, the method comprising:
    providing the posterior probability in a parametric form comprising one or more adjustable parameters;
    obtaining training data comprising a sequence of input samples and an N-gram joint probability distribution for a first sequence of output labels that are not correlated with the input samples; and
    using a computer processor to iteratively adjust the one or more adjustable parameters of the posterior probability to minimize a cost function, wherein the cost function comprises a negative cross-entropy of the N-gram joint probability distribution with respect to an expected N-gram frequency in a second sequence of output labels, the second sequence of output labels being predicted by the posterior probability from the sequence of input samples.

2. The method of claim 1, wherein providing the N-gram joint probability distribution comprises providing the first sequence of output labels and computing the N-gram joint probability distribution from the first sequence of output labels.

3. The method of claim 1, wherein adjusting the one or more adjustable parameters of the posterior probability comprises minimizing the cost function comprises computing a saddle point of an equivalent primal-dual formulation of the cost function.

4. The method of claim 3, wherein the saddle point is computed using a stochastic primal-dual gradient method.

5. The method of claim 4, wherein the stochastic primal-dual gradient method comprises initiating primal and dual variables of the primal-dual formulation of the cost function, and iteratively computing stochastic gradients of a component function with respect to the primal and dual variables and updating the primal variables in a direction of gradient descent and the dual variables in a direction of gradient ascent.

6. The method of claim 5, wherein the stochastic primal-dual gradient method comprises, in computing the stochastic gradients, replacing sample averages by randomly sampled components or randomly sampled mini-batch averages.

7. The method of claim 1, further comprising using the trained posterior probability to assign output labels to a test sequence of input samples.

8. The method of claim 1, wherein the sequences of output labels are sequences of characters or words in a human language.

9. The method of claim 8, wherein the sequence of input samples comprises a sequence of images.

10. The method of claim 8, wherein the sequence of input samples comprises a voice recording.

11. One or more machine-readable media storing instructions for execution by one or more hardware processors, the instructions, when executed by the one or more hardware processors, causing the one or more hardware processors to perform operations for training a classifier described by a posterior probability provided in parametric form, the operations comprising:

based on training data comprising a sequence of input samples and an N-gram joint probability distribution for a first sequence of output labels that are not correlated with the input samples, iteratively adjusting one or more parameters of the posterior probability to minimize a cost function, the cost function comprising a negative cross-entropy of the N-gram joint probability distribution with respect to an expected N-gram frequency in a second sequence of output labels, the second sequence of output labels being predicted by the posterior probability from the sequence of input samples.

12. The one or more machine-readable media of claim 11, wherein the cost function is minimized by computing a saddle point of an equivalent primal-dual formulation of the cost function.

13. The one or more machine-readable media of claim 12, wherein the saddle point is computed using a stochastic primal-dual gradient method.

14. The one or more machine-readable media of claim 13, wherein the stochastic primal-dual gradient method comprises computing stochastic gradients by replacing sample averages in the primal-dual formulation of the cost function by randomly sampled components or randomly sampled mini-batch averages.

15. The one or more machine-readable media of claim 11, the operations further comprising:
using the trained posterior probability to assign output labels to a test sequence of input samples.

16. A system comprising:
one or more hardware processors; and
one or more machine-readable media storing instructions that, when executed by the one or more hardware processors, cause the one or more hardware processors to perform operations for training a classifier described by a posterior probability provided in parametric form, the operations comprising:
based on training data comprising a sequence of input samples and an N-gram joint probability distribution for a first sequence of output labels that are not correlated with the input samples, iteratively adjusting parameters of the posterior probability to minimize a cost function, the cost function comprising a negative cross-entropy of the N-gram joint probability distribution with respect to an expected N-gram frequency in a second sequence of output labels, wherein the second sequence of output labels is predicted by the posterior probability from the sequence of input samples.

17. The system of claim 16, wherein the cost function is minimized by computing a saddle point of an equivalent primal-dual formulation of the cost function.

18. The system of claim 17, wherein the saddle point is computed using a stochastic primal-dual gradient method.

19. The system of claim 18, wherein the stochastic primal-dual gradient method comprises computing stochastic gradients by replacing sample averages in the primal-dual formulation of the cost function by randomly sampled components or randomly sampled mini-batch averages.

20. The system of claim 16, the operations further comprising:
using the trained posterior probability to assign output labels to a test sequence of input samples.

* * * * *